(12) United States Patent
Liu et al.

(10) Patent No.: US 10,900,003 B2
(45) Date of Patent: Jan. 26, 2021

(54) METHOD FOR MANUFACTURING INSTANT EGG/EDIBLE BIRD'S NEST SOUP WITH FERMENTED GLUTINOUS RICE

(71) Applicant: Pink Princess Biotechnology Co., Ltd. Leiyang Branch, Hunan (CN)

(72) Inventors: Yan Liu, Hunan (CN); Jun Liu, Hunan (CN)

(73) Assignee: Pink Princess Biotechnology Co., Ltd.

( * ) Notice: Subject to any disclaimer, the term of this patent is extended or adjusted under 35 U.S.C. 154(b) by 0 days.

(21) Appl. No.: 15/557,462

(22) PCT Filed: Mar. 13, 2017

(86) PCT No.: PCT/CN2017/076359
§ 371 (c)(1),
(2) Date: Sep. 11, 2017

(87) PCT Pub. No.: WO2017/157252
PCT Pub. Date: Sep. 21, 2017

(65) Prior Publication Data
US 2018/0103666 A1    Apr. 19, 2018

(30) Foreign Application Priority Data

Mar. 16, 2016 (CN) .......................... 2016 1 0148451

(51) Int. Cl.
*A23L 33/00* (2016.01)
*C12G 3/022* (2019.01)
*A23L 15/00* (2016.01)
*A23L 33/10* (2016.01)
*A23L 7/104* (2016.01)
*A23L 23/00* (2016.01)
*A23L 3/01* (2006.01)
*A23L 3/36* (2006.01)

(52) U.S. Cl.
CPC ................ *C12G 3/022* (2019.02); *A23L 3/01* (2013.01); *A23L 3/363* (2013.01); *A23L 7/104* (2016.08); *A23L 15/00* (2016.08); *A23L 23/00* (2016.08); *A23L 33/00* (2016.08); *A23L 33/10* (2016.08); *A23V 2002/00* (2013.01)

(58) Field of Classification Search
CPC ... A23L 3/01; A23L 3/363; A23L 3/00; A23L 7/104
See application file for complete search history.

(56) References Cited

U.S. PATENT DOCUMENTS 7,037,541 B2 * 5/2006 Okada ...................... C12G 3/02
426/13

OTHER PUBLICATIONS

Wen et al. (CN 104017693) Derwent Abstract (Year: 2014).*
Sagara et al. (JP 2000139427) Derwent Abstract (Year: 2000).*
Zhang (CN 105077351) Derwent Abstract (Year: 2015).*
Li (CN 104472997 Derwent Abstract) (Year: 2015).*

* cited by examiner

*Primary Examiner* — Felicia C Turner

(57) ABSTRACT

A method for manufacturing an instant egg/edible bird's nest soup with fermented glutinous rice, comprising the steps of preparing the fermented glutinous rice wine, separating the wine juice from the rice dregs, preparing the dehydrated egg droppings/edible bird's nest shreds, vacuum freeze drying and vacuum packing; the instant egg/edible bird's-nest soup with fermented glutinous rice manufactured according to the method of the present invention is easily portable, and can be immediately consumed after being brewed in hot water; the flavor of the brewed egg/edible bird's nest soup with fermented glutinous rice is fresh and sweet; the shape of the rice dregs and the egg droppings/edible bird's nest shreds can be perfectly kept, and the rice dregs and egg droppings/edible bird's nest shreds are soft and good-tasting.

1 Claim, No Drawings

METHOD FOR MANUFACTURING INSTANT EGG/EDIBLE BIRD'S NEST SOUP WITH FERMENTED GLUTINOUS RICE

TECHNICAL FIELD OF THE INVENTION

The present invention relates to the technical field of manufacturing fast food, and more particularly, to a method for manufacturing an instant egg/edible bird's nest soup with fermented glutinous rice.

BACKGROUND OF THE INVENTION

Fermented glutinous rice wine is a local flavor food made from glutinous rice, which has a high sweetness and a low alcoholic strength. Egg soup with fermented glutinous rice is popular in China especially in regions south of the Yangtze River. The flavor of the egg soup with fermented glutinous rice is sour-sweet and tasty, which is capable of nourishing the skin, improving one's complexion and promoting breast growth. Edible bird's-nest soup with fermented glutinous rice has effects such as maintaining beauty, keeping young, strengthening the immune system, and delaying aging.

In the prior art, the egg/edible bird's nest soup with fermented glutinous rice must be eaten once it is ready. Furthermore, such a soup has a complicated cooking process, and is difficult to be carried by eaters.

SUMMARY OF THE INVENTION

The purpose of the present invention is to solve the shortcomings in the prior art and provide a method for manufacturing an instant egg/edible bird's nest soup with fermented glutinous rice, through which the egg/edible bird's nest soup can be conveniently carried, and can be immediately ate after being brewed by hot water.

To achieve the above purpose, the present invention adopts the following technical solution:

A method for manufacturing an instant egg/edible bird's nest soup with fermented glutinous rice, comprising the steps of:

Step 1: steaming the glutinous rice into a medium-well degree;

Step 2: cooling the glutinous rice obtained from step 1 to a temperature of 32-34° C.; subsequently, adding distiller's yeast into the glutinous rice and uniformly mixing, thereby obtaining a mixture of the glutinous rice and the distiller's yeast, wherein the weight ratio of the glutinous rice and the distiller's yeast in the glutinous rice-distiller's yeast mixture is 1500:1-1200:1; subsequently, feeding the mixture of the glutinous rice and the distiller's yeast into a fermentation tank, wherein the volume ratio of the glutinous rice-distiller's yeast mixture in the fermentation tank and the air is 5:1-4:1; finally, placing the fermentation tank into an environment having a temperature of 27-29° C. to continuously ferment for 32-34 hours, thereby obtaining the fermented glutinous rice wine;

Step 3: separating the wine juice from the rice dregs in the fermented glutinous rice wine obtained from step 2 through a centrifugal separator; stopping the centrifugal separator and adding soda water having a PH value of 7.9-8.5 into the separating chamber of the centrifugal separator while the mass ratio of the wine juice and the rice dregs in the fermented glutinous rice wine reaches 3:7-2.5:7, wherein the mass ratio of the soda water and the rice dregs is 1:1.3-1:1.5; letting the mixture sit for 15-20 minutes, and then re-initiating the centrifugal separator to separate the soda water with the wine juice left in the fermented glutinous rice wine, thereby obtaining the soda water-wine juice mixture and the rice dregs;

Step 4: vacuum-packing and microwave-sterilizing the soda water-wine juice mixture obtained from step 3;

Step 5: preparing dehydrated egg droppings/edible bird's nest shreds having a water content of 2%-3%;

Step 6: freezing the rice dregs obtained from step 3 at a subzero temperature, and adding the dehydrated egg droppings/edible bird's nest shreds obtained from step 5 after the surface of the rice dregs is covered with frost; subsequently, uniformly stirring to obtain a mixture of the rice dregs and the egg droppings/edible bird's nest shreds; subsequently, stand-stilling the mixture of the rice dregs and the egg droppings/edible bird's nest shreds for half an hour; after the frost on the rice dregs melts into water and the dehydrated egg droppings/edible bird's nest shreds absorb water to become soft, re-freezing the mixture of the rice dregs and the egg droppings/edible bird's nest shreds at a temperature of −30° C. to −35° C. for 7-8 hours;

Step 7: placing the frozen mixture of the rice dregs and the egg droppings/edible bird's nest shreds into a vacuum freeze drier, and vacuum freeze-drying for 30-36 hours at a temperature of −10° C. to −15° C.; subsequently, vacuum-packing and microwave-sterilizing the dried mixture of the rice dregs and the egg droppings/edible bird's nest shreds.

Compared with the prior art, the present invention has the following advantages:

The present invention provides a method for manufacturing an instant egg/edible bird's-nest soup with fermented glutinous rice, through which the egg/edible bird's-nest soup can be conveniently carried immediately eaten after being brewed in hot water. The flavor of the brewed egg/edible bird's nest soup with fermented glutinous rice is fresh and sweet. Furthermore, there are very few crumbs produced in the manufacturing process, perfectly keeping the shape of the rice dregs and the egg droppings/edible bird's nest shreds. The rice dregs and the egg droppings/edible bird's nest shreds manufactured are soft and good-tasting.

DETAILED DESCRIPTION OF THE INVENTION

Detailed embodiments are combined hereinafter to elaborate the technical principles of the present invention.

In one embodiment of the present invention, the method for manufacturing an instant egg/edible bird's nest soup with fermented glutinous rice, comprising the steps of:

Step 1: steaming the glutinous rice into a medium-well degree;

Step 2: cooling the glutinous rice obtained from step 1 to a temperature of 32-34° C.; subsequently, adding distiller's yeast into the glutinous rice and uniformly mixing, thereby obtaining a mixture of the glutinous rice and the distiller's yeast, wherein the weight ratio of the glutinous rice and the distiller's yeast in the glutinous rice-distiller's yeast mixture is 1500:1-1200:1; subsequently, feeding the mixture of the glutinous rice and the distiller's yeast into a fermentation tank, wherein the volume ratio of the glutinous rice-distiller's yeast mixture in the fermentation tank and the air is 5:1-4:1; finally, placing the fermentation tank into an environment having a temperature of 27-29° C. to continuously ferment for 32-34 hours, thereby obtaining the fermented glutinous rice wine;

Step 3: separating the wine juice from the rice dregs in the fermented glutinous rice wine obtained from step 2 through a centrifugal separator; stopping the centrifugal separator and adding soda water having a PH value of 7.9-8.5 into the separating chamber of the centrifugal separator while the mass ratio of the wine juice and the rice dregs in the fermented glutinous rice wine reaches 3:7-2.5:7, wherein the mass ratio of the soda water and the rice dregs is 1:1.3-1:1.5; let the mixture sit for 15-20 minutes, and then re-initiate the centrifugal separator to separate the soda water with the wine juice left in the fermented glutinous rice wine, thereby obtaining the soda water-wine juice mixture and the rice dregs;

Step 4: vacuum-packing and microwave-sterilizing the soda water-wine juice mixture obtained from step 3;

Step 5: preparing dehydrated egg droppings/edible bird's nest shreds having a water content of 2%-3%;

Step 6: freezing the rice dregs obtained from step 3 at a subzero temperature, and adding the dehydrated egg droppings/edible bird's nest shreds obtained from step 5 after the surface of the rice dregs is covered with frost; subsequently, uniformly stirring to obtain a mixture of the rice dregs and the egg droppings/edible bird's nest shreds; let the mixture of the rice dregs and the egg droppings/edible bird's nest shreds sit for half an hour; after the frost on the rice dregs melts into water and the dehydrated egg droppings/edible bird's nest shreds absorb water to become soft, re-freezing the mixture of the rice dregs and the egg droppings/edible bird's nest shreds at a temperature of −30° C. to −35° C. for 7-8 hours;

Step 7: placing the frozen mixture of the rice dregs and the egg droppings/edible bird's nest shreds into a vacuum freeze drier, and vacuum freeze-drying for 30-36 hours at a temperature of −10° C. to −15° C.; subsequently, vacuum-packing and microwave-sterilizing the dried mixture of the rice dregs and the egg droppings/edible bird's nest shreds.

It's important to note that the above embodiment defines the range of some parameters. Those skilled in the art should understand that the present invention relates to a food manufacturing process, and the above parameters can be selected within the defined range according to the requirements of the weight and taste of the fermented glutinous rice wine (e.g., fermentation time can be properly prolonged and fermentation temperature can be properly raised to increase the alcohol content in the fermented glutinous rice wine).

Another significant feature of the present invention is that the wine juice is packaged separately from the rice dregs and the egg droppings/edible bird's nest shreds, thereby allowing this fast food to be conveniently carried. Furthermore, soda water is added after a part of the wind juice is separated, through which acidic substances (on condition that no acetic acid or lactic acid is produced in the fermented glutinous rice wine, and the subsequent microwave-sterilization is incomplete and a trace amount of bacillus aceticus is left therein, the acetic acid produced by the residual bacillus aceticus can also be neutralized by soda water) such as acetic acid and lactic acid produced in the fermented glutinous rice wine can be neutralized, thereby avoiding a sour taste of the wine juice and the rice dregs. Furthermore, soda water added therein can effectively dilute the sugar in the rice dregs, thereby greatly decreasing the viscosity of the rice dregs. Therefore, the dehydrated egg droppings/edible bird's nest shreds can be uniformly mixed in the rice dregs, effectively preventing the rice dregs from being mashed. Additionally, the rice dregs and the dehydrated egg droppings/edible bird's nest shreds can absorb a part of soda water before being vacuum freeze dried. After the vacuum freeze-drying process is completed, sodium bicarbonate penetrates into the rice dregs and the dehydrated egg droppings/edible bird's nest shreds. Thus, after being stored for a period of time and soaked in hot water, the rice dregs and the egg droppings/edible bird's nest shreds become soft and delicious. Moreover, the rice dregs are pre-frozen until the surface is covered with frost, and the dehydrated egg droppings/edible bird's nest shreds are subsequently added and stirred with the frozen rice dregs. In such a way, the frozen rice dregs have a higher strength than those in a soft and humid state, further protecting the rice dregs from being mashed.

The instant egg/edible bird's-nest soup with fermented glutinous rice manufactured according to the method of the present invention can be conveniently carried, and can be immediately ate after being brewed in hot water. The flavor of the brewed egg/edible bird's nest soup with fermented glutinous rice is fresh and sweet. Furthermore, there are few crumbs produced during the manufacturing process, perfectly keeping the shape of the rice dregs and the egg droppings/edible bird's nest shreds. The rice dregs and egg droppings/edible bird's nest shreds are soft and good-tasting.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A method for manufacturing an instant egg and edible bird's nest soup with fermented glutinous rice, comprising the steps of:
   Step 1: steaming a glutinous rice;
   Step 2: cooling the glutinous rice obtained from step 1 to a temperature of 32-34° C.;
   adding distiller's yeast into the glutinous rice and stirring uniformly to obtain a mixture of the glutinous rice and the distiller's yeast, wherein the weight ratio of the glutinous rice and the distiller's yeast is 1500:1-1200:1; placing mixture of the glutinous rice and the distiller's yeast into a fermentation tank, wherein the volume ratio of the mixture of the glutinous rice and the distiller's yeast and the air is 5:1-4:1; placing the fermentation tank into an environment having a temperature of 27-29° C. for 32-34 hours-to obtain a fermented glutinous rice wine;
   Step 3: separating wine juice from rice dregs in the fermented glutinous rice wine obtained from step 2 using a centrifugal separator; stopping the centrifugal separator and adding soda water having a pH value of 7.9-8.5 into the separating chamber of the centrifugal separator when the mass ratio of the wine juice and the rice dregs in the fermented glutinous rice wine reaches 3:7-2.5:7, wherein the mass ratio of the soda water and the rice dregs is 1:1.3-1:1.5; re-initiating the centrifugal separator after 15-20 minutes to separate the soda water and the wine juice to obtain a soda water-wine juice mixture and the rice dregs;
   Step 4: vacuum-packing and microwave-sterilizing the soda water-wine juice mixture obtained from step 3;

Step 5: preparing instant egg and edible bird's nest shreds, both having a water content of 2%-3%;

Step 6: freezing the rice dregs obtained from step 3 at a temperature below 0° C., adding the instant egg and edible bird's nest shreds obtained from step 5 to the frozen rice dregs after the surface of the rice dregs is covered with frost to obtain a mixture of rice dregs, instant egg and edible bird's nest shreds; stand-stilling the mixture of the rice dregs, instant egg and edible bird's nest shreds for half an hour; re-freezing the mixture of the rice dregs, instant egg and edible bird's nest shreds at a temperature of −30° C. to −35° C. for 7-8 hours;

Step 7: placing the mixture of the rice dregs, instant egg and edible bird's nest shreds into a vacuum freeze drier for 30-36 hours at a temperature of −10° C. to −15° C.; vacuum-packing and microwave-sterilizing the mixture of the rice dregs, instant egg and edible bird's nest shreds.

* * * * *